(12) United States Patent
Farringdon

(10) Patent No.: US 9,846,311 B2
(45) Date of Patent: *Dec. 19, 2017

(54) METHOD AND APPARATUS FOR FORMING A VISIBLE IMAGE IN SPACE

(71) Applicant: Jonathan Stephen Farringdon, Pittsburgh, PA (US)

(72) Inventor: Jonathan Stephen Farringdon, Pittsburgh, PA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/341,778

(22) Filed: Jul. 26, 2014

(65) Prior Publication Data

US 2016/0259298 A1 Sep. 8, 2016
US 2017/0315373 A9 Nov. 2, 2017

Related U.S. Application Data

(60) Provisional application No. 61/860,087, filed on Jul. 30, 2013.

(51) Int. Cl.
*G03H 1/02* (2006.01)
*G03H 1/26* (2006.01)
*G02B 27/22* (2006.01)

(52) U.S. Cl.
CPC ................ *G02B 27/2292* (2013.01)

(58) Field of Classification Search
None
See application file for complete search history.

(56) References Cited

U.S. PATENT DOCUMENTS

| | | | | |
|---|---|---|---|---|
| 2006/0262411 A1* | 11/2006 | Dunn | .................. | B44F 1/10 359/619 |
| 2009/0080466 A1* | 3/2009 | Yamamoto | ............... | G03H 1/02 372/5 |
| 2010/0136611 A1* | 6/2010 | Maurer | .............. | G01N 15/1429 435/39 |
| 2010/0316959 A1* | 12/2010 | Gates | .................. | G02B 3/0056 430/321 |
| 2013/0215515 A1* | 8/2013 | Kinoshita | ............ | G02B 3/0056 359/619 |
| 2014/0168210 A1* | 6/2014 | Bromer | .............. | G02B 26/0816 345/419 |
| 2014/0230897 A1* | 8/2014 | Waldman | ............ | H01L 31/0543 136/259 |
| 2015/0008829 A1* | 1/2015 | Lurie | ................. | H05B 37/0245 315/153 |

* cited by examiner

*Primary Examiner* — Reza Aghevli
(74) *Attorney, Agent, or Firm* — Klein, O'Neill & Singh, LLP

(57) ABSTRACT

A device that creates visible light in space comprises of a light source and optics system that result in irradiated visible spectrum light rays with a low intensity such that the light is not visible by the normal observer. Multiple rays of visible-spectrum low-intensity non-visible light intersect. When the constructive intensity of the intersecting light is above the threshold for being visible then light appears at that place. The light rays to and from the visible light remain non-visible. The addition of irradiated visible light results in additional visual effects. The visible light can be moved in space, and form multi-dimensional images and holograms. User and programmable controls, with communication abilities and data storage, can mediate the light source and optics to control the visible image.

14 Claims, 8 Drawing Sheets

METHOD AND APPARATUS FOR FORMING A VISIBLE IMAGE IN SPACE

CROSS-REFERENCE TO RELATED APPLICATIONS

This application claims the priority of U.S. provisional application Ser. No. 61/860,087, entitled "device for forming a visible image in space" filed on 30 Jul. 2013, the entire contents and substance of which are hereby incorporated in total by reference.

BACKGROUND OF THE INVENTION

Field of the Invention

The present invention is in the technical field of lighting. More particularly, the present invention is in the technical field of creating visible light in a particular place. More particularly, the present invention is in the technical field of creating multi-dimensional images with light. More particularly, the present invention is in the technical field of creating moving images with light. More particularly, the present invention is in the technical field of creating moving multi-dimensional images with light.

Description of the Related Art

Conventional devices for creating light in space, or images in space sometimes referred to as holograms, typically create a visible image in light as well as visible scanning lines or other visible image creation artifacts, or they use lasers outside of the visible spectrum with sufficient power to create visible plasma from the viewing medium such as air or water. Being able to see the visible light used to create the visible image can detract from the image, and high powered light sources can be dangerous for observers.

Light appearing in space, some holograms, and disembodied lighting may be described as visible lighting in one place that is spatially and or visibly disconnected from the lighting device.

Light bulbs from the incandescing type (U.S. Pat. No. 223,898, Jan. 27, 1880, T A Edison) to the recent LED type (U.S. Pat. No. 8,439,528, May 14, 2013, R J Lenk et al) create visible light. Many do so with sufficient brightness to illuminate rooms, they may be safely handled and maintained by homeowners, and they convert energy into light with increasing efficiency as technologies develop. One common feature of such light sources is that the mechanism of the light source is at the same place of the visible light, that is to say the visible light appears to emanate from inside of the light bulb. This is a shortcoming when disembodied lighting is desired.

A traditional mounting place for a light bulb in the home is the ceiling mount, where a chord hangs from the ceiling and the light source is high in the room. When disembodied lighting is desired, one shortcoming of such a light source is that there is a visible supporting mechanism connecting the light source to the ceiling.

Lamps such as angle-poise lights (U.S. Pat. No. 2,090,439, Aug. 17, 1937, G Carwardine) have a light source at the end of a movable stand or frame allowing the light source to be moved in two or three dimensions. When disembodied lighting is desired one shortcoming of such light sources is that there is a visible supporting mechanism connecting the light source to the floor or desk or some other mounting surface.

Lasers (U.S. Pat. No. 8,104,894, Jan. 31, 2012, K Mori et al) can create visible light that can be shone in beams to present visible images and data. A laser beam can be shone at a target surface such as a wall creating a spot of light on the target surface. With the usual amount of dust and particles in normal air, in the absence of bright light such as sunlight, a laser beam can be seen as a straight line of light from the laser source to the wall, at least that is the perception to a human observer. The reflected light on the wall is usually brighter than the light reflected along the beam by the particles. One shortcoming of such light is that both the target light is visible and the beam or scanning beams of light are visible. In some settings such as a night club or live music concert the visible scanning beams of a laser are used as a lighting effect and are intended to be seen.

There are lighting devices that draw visible images in a screen or wall by scanning a laser beam, the scanning is in one or two or three dimensions. Visible images are created by devices that form a screen in the air using smoke and shine a scanned laser beam onto this screen forming a visible image. The visible image can be just light, or be rendered as information such as words or graphic images. One shortcoming of such light is that both the target is visible and the beam or scanning beams of light are visible.

Scanning and focusing light and lasers is well understood and found in everyday items such as focusable flash lights, television screens, video projectors, cinema projectors, pen-light lasers, night club lighting including scanning pattern generating lasers, as well as in devices to position light in air (U.S. Pat. No. 7,776,485, Aug. 3, 2010, Momiuchi et al).

The presentation of partial and still images shown in time sequence to give the impression of a moving image to an observer is well know, including the flick book (British Patent 925, Mar. 18, 1868, John Linnett; U.S. Pat. No. 259,960, Jun. 20, 1882, Henry Van Hoevenbergh), film and cinema (U.S. Pat. No. 589,168, Aug. 31, 1897, Thomas Edison), television (U.S. Pat. No. 2,133,123, Oct. 11, 1938, Kaunan Tihanyi), and computer displays. All of these devices use, to some extent, the human eye and visual systems ability to see and perceive sequences of still images as continuous moving images.

In a cathode ray tube television set an electron beam is fired, scanned, and aimed at a target surface coated with a suitable substance such as phosphor. The electron beam is not visible by a human observer, but the phosphor that absorbs the electron beam energy converts some of that energy to visible light. One shortcoming of such light sources is that the target surface must be made of a material that can convert an invisible source of electrons and associated energy into visible light. Another shortcoming of such light sources is that the target surface itself tends to be fairly opaque.

A photographic reflection hologram (U.S. Pat. No. 8,440,370, May 14, 2013, S Martin et al) can render a three dimensional view of a scene when illuminated. One shortcoming of such a three dimensional optical image is that the image is stationary; it is a still photograph or a series of still photographs, and only gives the illusion of being a three dimensional image.

The illusion of a three dimensional image is created 3D televisions and 3D cinema marketed in 2013. These and similar systems send different images to each eye. In the minds-eye the image is 3-dimensional, and is sometimes referred to as "coming out of the screen". One shortcoming of such systems is that they require special glasses or headsets or per-eye image manipulation devices to be worn near the eyes, such as 3D glasses. When the image manipulation component is removed, say the 3D glasses are taken off, the viewer finds the image is not really in 3D. Lenticular displays use two images, one for each eye, but do not require special 3D glasses. One shortcoming of 3D displays that use 3D glasses and of lenticular displays is that the three dimensional image is an illusion in the minds-eye and the image is not really in three dimensions and is not separate from the viewing medium or image creation device.

A computer generated hologram (U.S. Pat. No. 8,451,428, May 28, 2013, I Matsubara) can render an image using multiple polarizations of light projected into a medium with multiple substrates that are differently sensitive to specific polarizations of light. One shortcoming of such a visible image is the complex nature of the viewing medium, another shortcoming is the complex nature of the optics.

A laser beam or other visible light in the visible spectrum can be used to draw a visible image in air or on a screen or to illuminate a hologram. One shortcoming of this is that the scanning locus of the laser beam or light is visible and seen drawing the image as well as the image itself being visible. Another shortcoming of this is when screens are made visible as well as the image.

Using a light source, analogue and digital imaging, optics and a computer controlled DLP micro mirror projector, a still image or computer screen image or video image can be projected, usually onto a flat viewing area. Such video projectors are commonplace in cinemas and offices, as well as homes and "home cinema."

Using a light source, analogue and digital imaging, optics and a computer controlled DLP micro mirror projector (U.S. Pat. No. 7,926,951, Apr. 19, 2011, R J Bietry et al) a holographic image can be rendered (Optical Society of America, 10 Mar. 2003, Vol. 11, No 5, Optics Express 437. M L Huebschman et al). One shortcoming of such a system is that the holographic image is rendered on a flat surface, for example the three dimensional image can be viewed in either the micro mirror itself or in a sheet of glass.

In a dimly lit room, with the normal amount of dust motes in the air, two laser pointers (U.S. Pat. No. 7,971,790, Jul. 5, 2011, C L Hung et al) may be oriented so that their laser beams cross. Two beams of light would be seen that came from the lasers, crossed at a point that appears brighter than the beam, and then the beams carry on in their original direction. For lighting a particular place where the beams cross, one shortcoming of such a system is that the laser beam is visible to that point and past that point.

A system exists for drawing two-dimensional and three-dimensional visible images using scanned and focused laser light tuned to illicit plasma from the air. The plasma is visible while the laser light is not in the visible spectrum and this creates a visible flash of light positioned in space (U.S. Pat. No. 7,776,485, Aug. 3, 2010, Momiuchi et al; U.S. Pat. No. 7,533,995, May 19, 2009, Momiuchi et al). The laser light can be made invisible to a human observer by being in the infra-red color spectrum for example, a color that is not visible to a human observer. One shortcoming of such a system is that an "impact noise is generated" when creating plasma. Another shortcoming of such a system is that plasma has to be created from the viewing medium such as air or water. Another shortcoming of such a system is that the laser light source is relatively high powered, requiring sufficient power to create plasma from air or water. Another shortcoming of such a system is that infrared lasers and lasers with power capable to create plasma from air pose inherent safety risks for nearby observers.

The human eye sees visible light. The eye has varying sensitivity to different colors of light. Specifically there are components in the eye called "cones" that are differently sensitive to red, green and blue light. Schubert describes the "eye sensitivity function" in terms of light color (wavelength), with the eye being increasingly sensitive to violet (around 400 to 450 nm wavelength), blue (around 475 nm wavelength), cyan (around 500 nm wavelength), then maximally sensitive to green (around 520 to 570 nm wavelength). After green the eye is decreasingly sensitive to yellow (around 570 to 600 nm wavelength), orange (around 600 to 620 nm wavelength), and red light (620 to 750 nm wavelength). This makes up the visible spectrum of light for humans; ("Light Emitting Diodes", Second edition, by E. F. Schubert. Cambridge University Press, 2006.) The approximate vision range for humans is described by Schubert in terms of {no moon, moonlight, twilight, store or office, and sunny outdoors}. At night in low ambient light humans use "Scotopic vision", with luminance levels from 1E-6 to <0.003 $cd/m^2$, "the sense of color is essentially lost in the scotopic vision regime". In moonlight to twilight humans use "Mesopic vision", with luminance levels from 0.003 to 3 $cd/m^2$. In high ambient light humans use "photopic vision", with luminance levels from 3 to 1E6 $cd/m^2$. ("Light Emitting Diodes", Second edition, by E. F. Schubert. Cambridge University Press, 2006.)

Many devices that use light that is not intended to be seen by humans use light in the non-visible spectrum, such as infrared light for television remote control units, "invisible" security lighting that can not be seen by humans but can be sensed by specially tuned cameras, and non-visible lasers for creating visible plasma (U.S. Pat. No. 7,776,485, Aug. 3, 2010, Momiuchi et al).

The scientific understanding that visible colors can be created by combining other colors is long established and well understood since the introduction of the color wheel ("Opticks", 1706, Sir Isaac Newton).

With readily available consumer devices such as mobile phones, printers, computer displays, televisions and video projectors; digital images can be rendered in vivid colors close to the original color, in focus, and in great clarity and detail. However it is also common to apply artifacts to these clean images such as visual effects, and artifacts that are culturally and historically understood such as adding visual aspects found in film photography. Culturally and historically understood visual artifacts include making a color digital image look old-fashioned by changing from color to sepia-tone, reduced color or saturating color, or adding scratches and dust. Such effects are commonly applied to still and moving image. The mobile phone application "Instagram" (Facebook Inc, California, USA) performs such image manipulations and has over 130 million users applying their image filters to over 45 million photos and movies per day (Statistics from Instagram on Jul. 5, 2013).

BRIEF SUMMARY OF THE INVENTION

The nature of the present invention relates generally to a method and apparatus for forming an image. More specifically, the present invention is a method and device for forming a visible light which can render visible images such as still or moving patterns, colors, words, and pictures, etc, in one-dimension or multiple-dimensions in space and over time. The device solves the problem of safely creating genuine multi-dimensional images in space, without necessarily visible scanning and image creation artifacts.

Briefly described, the invention comprises of a device that operates by creating multiple rays of light that are in the visible spectrum with a low intensity such that the light is not visible by a normal observer. Rays of low-intensity non-visible light intersect. When the constructive intensity of the intersecting light is above the threshold for being visible by an observer the light appears. The light rays to and from the visible light remain non-visible. By moving the light ray intersection points patterns and moving images can be made of light in space.

The device operation may include controls and sensors that can calibrate the visible and non visible light. Together with data communications and storage the device can render image data, with audio, tactile and other sensory modalities, modifying the output depending on user controls and sensor observations.

The purpose of the device is to create lighting effects and visual images in space sometimes referred to as holograms. An advantage of the device is that a visible image in space can be created safely, without requiring visible scanning lines and image creation artifacts associated with visible light sources. The device may work in concert with other similar devices.

DETAILED DESCRIPTION OF THE INVENTION

Figure 1:
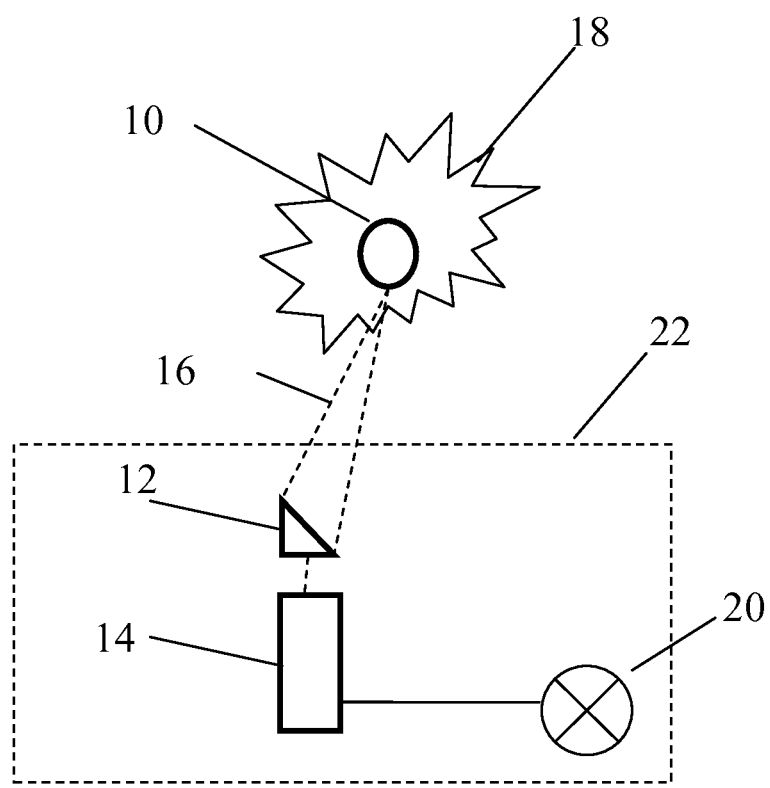
FIG. 1 is a schematic view of a device for forming visible light in space of the present invention.

The present invention provides a solution to creating visible light in space without requiring scanning or other visible image creation artifacts, creating one-dimensional and multi-dimensional images, lighting effects, image sequences and holograms. The light from the device can be at a low power, with the associated safety benefits for nearby observers of low power light, thus being suitable for consumer use and home use as well as artistic, professional, scientific, educational, military, medical, and other uses. The creation of the visible light does not cause any sound per se.

The present invention combines an understanding of the physics properties of light, the physical, scientific, and technical properties of components that comprise of the device, together with the physiological and biological responses of the human eye and human visual perception.

The light experienced in everyday life is visible spectrum light. We expect to see visible spectrum light, and it is somewhat counter intuitive that there is visible-spectrum light that is not visible. The color of light is determined by the frequency. The visibility of light is determined by the frequency and by the intensity. The eye can only perceive rays of light that have sufficient intensity. Low intensity light, even in the visible spectrum, cannot be seen. Visible spectrum light beams that are not visible to the observer may have intensities that vary depending on the ambient light level or the observer's vision system. In a well lit environment when the observer is using photopic vision light beams with an intensity level of less than 3 $cd/m^2$ are not visible. While the observer is using mesopic vision and the ambient light intensity is over 0.003 $cd/m^2$ light beams with an intensity level that is less than 0.003 cd/m2 are not visible. In the dark when the observer is using scoptic vision light beams with an intensity of less than 1E-6 $cd/m^2$ are not visible. Because all observers are not identical, the intensity values of non visible light are not exactly the same for all observers but are better described by statistical distributions.

The visible spectrum of light for humans has a wavelength of around 380 to 740 nm. For each vision system, the human eye has different visibility-intensity thresholds for different colors. Different human observers will have slightly different visibility-intensity thresholds. For a group of random adult observers with fully developed eye sight, for each vision system there will be an intensity-visibility-threshold for a specific color (frequency) whereby 65% of the observers can-not see the light if the intensity is at or below this value, this is the 65%-intensity-visibility-threshold-for-frequency-f. There will be a lower intensity threshold whereby 95% of the observers can-not see the light if the intensity is at or below this 95%-intensity-visibility-threshold-for-frequency-f. By varying the intensity of the visible wavelength light is it possible to set the intensity so that all human observers with normal healthy eyesight can see the light, down through 65% not being able to see it, down to 95%, down to 99% of observers not being able to perceive the light, and so forth. Some light sensors, cameras, and animals may detect the presence of a low intensity light when a human observer does not.

For convenience the human observer is frequently referred to, while the invention is not limited to human observers. When the intended observers are human the visible spectrum has a range of about 380 to 740 nm. When the intended observers are animals use the visible light spectrum and intensity-visibility-threshold of those animals. Some insects and birds for example can see light in the ultraviolet spectrum of 300 to 400 nm. When the intended observers are light sensors such as cameras then use the visible light spectrum and intensity-visibility-threshold of the light sensor. This allows for the visual effect of the invention that a human can see first hand being photographed or filmed.

The present invention uses light that is in the human visible spectrum with an intensity that is not visible by the human eye of an observer. Two rays of light or more are used, from one or more light sources, where the light is in the visible spectrum with an intensity that is not visible by observer. Visible light may also be present. The optics are aligned so that there is at least one place where more than one of these rays of light intersect. Light intensity is constructive, and when the constructive intensity of the light is above the threshold for being visible for an observer, the light appears at that place. The light beams to and from the visible light remain non-visible. This device can place visible light in one-dimension and multi-dimensional locations, creating visible light quietly, with low power requirements, in a wide range of visible colors, and thus project light, patterns, images and data in light in one-dimension and multiple-dimensions. The present invention can use rays of non-visible light and rays of visible light, to have at the intersections a visible light image that is brighter than the rest of the visible rays of light, and or of a different color to the originating visible ray of light.

Creating a visible image in space without visible scanning lines or other artifacts may produce a clean visual image in space. There are some culturally and historically understood visual artifacts associated with holographic images, largely set by the film industry where filmmakers use visual effects to illustrate what a hologram might look like. Such culturally and historically understood visual artifacts include some visible scan lines surrounding the subject image.

If the desired impression for an observer is an image in light in space with visible scan lines or artifacts then those artifacts can be introduced. For example, the widely known hologram scene in the movie Star Wars (George Lucas, 1977) has an image in light of the character Princess Leia together with some visible scanning or image creation lines. This is a visual special effect in the film where the director imagined what a three dimensional image in space would look like. Many people have been influenced by this film and have expectations that a hologram will look like this, also when many people see an image that looks like this they recognize it as a hologram. Another instantly recognizable light in space is the "light saber". In the widely known light saber training scene in the movie Star Wars (George Lucas, 1977) the character Luke Skywalker moves a line of light that starts at a handle, projects about 1 m in a straight line, and then just stops. There is a swooshing and buzzing sound related to the movement of the light. The light saber (a bar of light) is a visual effect in the film where the director imagined what a sword made of light would look and sound like. A bar of light can not be made with a laser light say, because visible laser light would be visible for the first meter as desired, and then continue to be visible as it continued into the distance, the visible laser light does not just stop after a set distance. This invention can create light in specific places in space without continuous lines of light to and from those places, thus enabling actual visual effects that are similar to these movie special effects.

While it is possible to construct an embodiment of this invention without programmable or software-executing components, like many modern electronics devices this invention would normally be programmable. Being programmable bestows advantages such as construction using common electronics components, updating software in order to fix problems, and updating software to improve and increase product operation and features.

In a first aspect of the invention, a visible light formation device is disclosed that comprises of a light source and optics system that result in visible spectrum light with a low intensity such that the light is not visible by a normal observer. Multiple rays of visible spectrum low-intensity non-visible light intersect. When the constructive intensity of the intersecting light is above the threshold for being visible then light appears at that place. The light rays to and from the visible light remain non-visible. The addition of visible light results in additional visual effects. When the observer is using photopic vision light rays with an intensity level of less than 3 cd/m$^2$ are not visible. While the observer is using mesopic vision and the ambient light intensity is over 0.003 cd/m$^2$ light rays with an intensity level that is less than 0.003 cd/m2 are not visible. This is the core of the invention using the combination of the observer's physiology and the constructive intensity physics of low-intensity non-visible visible-spectrum light in a system that creates observable light to appear in space.

In the first aspect there may be and a plurality of internal and user controls operative to adjust aspects of the light source and the optics system such that the controls are structured to adjust the intensity and frequency of the rays of light. With the introduction of control, the device can be used in more technically sophisticated ways.

In a second aspect of the invention, the light source and or the optics system are operative to generate multiple and or adjustable frequencies/colors of light; and sub light sources can act as a compound light source. Further, the optics system comprises of at least one of: a combination of lenses, filters, scanning mechanisms, mirrors, oscillating mirrors, rotating shaped mirrors, and micro-machines, and DLP micro mirror projectors. The optics may be capable of reducing the intensity of visible light so that is it not visible. For example in a lit room, a 5 mW (max) 650 nm wavelength red class Ma laser may have its beam intensity reduced using a sequence of 5 neutral density filters of density rating 2 (1F-stop, 50% transmittance), 8 (3F-stops, 12.6% transmittance), 8, 8, and 2. Still further, the optics system comprises of at least one of: a plurality of analog components; a plurality of digital components. Suitable light sources include one or more light bulbs, light emitting diodes, lasers, electroluminescent material, and the display of a computing device. Light sources such as flames and plasma are possible to use; while perhaps less practical such light sources may be desirable if making the device in the steam-punk genre.

In the second aspect, the light source and optics system operate together to create a one-dimensional or multi-dimensional visible image, where the image may be fixed or moved, animated or sequenced. Again, in the second aspect, the non-visible rays of light are in the visible spectrum at an intensity that is not visible to the observer, and a suitable viewing medium comprises of at least one of: normal air, air with dust motes, air with added particulates, smoke, gas or liquid, gas or liquid with added particulates, and agitated gas or liquid. Further, the optics system is structured to mediate aspects of path, focus and other optical properties of light.

In the second aspect, the device may further include an array of structured replica and non replica light sources and optics and controls that are in different locations that together form a visible image. The device, which is capable of operating independently, may operate and create visible images with other similar devices in concert.

In the second aspect, the device may further comprise of a data communication section and image data, wherein the control system is operative to control the light source and optics system and send control signals and receive feedback signals. The control system may calibrate aspects of the system including the optics, the light source, and the visible light. Outputs may include a buzzer, a speaker for audible output, a vibrator for tactile output, a visual display, a tactile display, a data channel for data output, and an audio channel for audio data output. The visible image may be automatically adjusted based upon situation, say the time of day, or by varying inputs such as sensor values and the other outputs may also be automatically adjusted. For example an application may make sounds and change the intensity and frequency/color of the light as the device is handled and moved; and another application my make visible light to serve as a clock or alarm.

In the second aspect, the data communication section is operative to allow the control system to communicate with other devices connected through at least one of a wired connection or a wireless connection, and internet protocols and standards such as Wi-Fi (Wi-Fi Alliance, Austin, USA). The other devices may include other visible image forming devices, remote control devices such as applications running on smart phones, and devices that can mediate the viewing medium. The device may also include sensors. The sensors may comprise of at least one of: digital, analogue, motion, orientation, acceleration, light, radiation, magnetic, electromagnetic, sound, contact, humidity, pressure, olfactory, and capacitive sensors. Further, the sensors may be structured for remote sensing and wireless sensing.

In the second aspect, the controller may be a general computing device, and may have a programmable component. The control system may be a computing device that can operate independently of the device, such as a programmable smart-phone, tablet computer, or computer. The control system can store and retrieve data, such as image data or movie data, and may be able to accept memory media such as memory cards and sticks.

In the second aspect, the visible and non-visible light intensities are tuned for the observer, who may be human, or may be an animal, or a light sensor for example in a camera or vision system.

In a third aspect of the invention, a separate computing device with its own display is used as the control system and the light source. The optics system is placed over the computing device display. Software runs on the computing device that is aware of the capabilities of the computing device and the optical properties of the optics system. The computing device, control software, and optics system together create non-visible rays of light that are in the visible spectrum at an intensity that is not visible to an observer. The optics system causes rays of light to intersect. When the constructive intensity of the intersecting light is above the threshold for being visible then light appears at that place. The light rays to and from the visible light remain non-visible. The addition of visible light results in additional visual effects. The control system software on the computing device may include a plurality of internal and user controls operative to adjust aspects of the light source such as the intensity and frequency of the rays of light.

In a fourth aspect, the device can form still images and animated/moving images. Using visible and non visible rays of light the device may cause visible light rays of one color to be a different color or intensity at the intersection points.

Referring now to the invention shown in FIG. 1 there is shown a device for creating visible light in space 22, having a visible light 10 and multiple rays of non-visible light 16 intersecting in a viewing medium 18. The lighting device 22 consists of optics 12 and a light source 14, and user controls 20.

In more detail, still referring to the invention of FIG. 1 the visible light 10 is located in a suitable viewing medium 18 such as normal air and dust motes. The non-visible rays of light 16 are in the visible spectrum at an intensity that is not visible to the normal observer. When sufficient non-visible intensity light rays combine the constructive nature of light intensity result in light of an intensity that it is visible, 10. The light source 14 creates light which may be at a non-visible intensity and—or at a visible intensity. The light rays 16 leaving the optics 12 are at a non-visible intensity and additional visible light may also be present. User controls 20 can adjust aspects of the light source 14 and optics 12, for example adjust the intensity of specific colors of light of the light rays 16. The light source 14 and optics 12 may generate multiple colors of light by the mediation of the light source 14 for example by adjusting the frequency or adjusting the combination of sub light sources in a compound light source, and—or by adjusting the optics 12, for example by using filters.

In further detail, still referring to the invention of FIG. 1 a convenient light source 14 may be one or more lasers which are available at sizes less than 5 cm^3, or pulse lasers with a pulse width of say 50 ns or less, or LEDs that may have a size of less than 5 mm^3. The optics 12 mediate aspects of path, focus, and other optical properties of the light. These may be combinations of lenses and filters or micro machines such as DLP micro mirror projectors similar to those used in video projectors, or use a scanning mechanism such as an oscillating mirror and a rotating shaped mirror. The viewing medium 18 should be of a size suitable for the visible light image 10. Normal air containing naturally occurring dust motes may be sufficient, although other natural and artificially created viewing mediums may be used.

The construction details of the invention as shown in FIG. 1 are that the light source 14 is made from LEDs or lasers or other lighting device materials such as light bulbs, and the optics 12 can be any suitable optics components and materials such as glass, plastics, or mirrored material or micro machines with mounting or integrated materials for controlling the movement and positioning of the light rays 16. A simple construction has the components fixed such that the relative position of the visible light 10 is fixed with respect to the position of the device 22. More sophisticated construction involves movement of the visible light 10 for example by means such as mechanical, micro-mechanical, and—or electronically controlled where the light source 14 and—or optics 12 adjust so that the relative position of the visible light 10 can be changed with respect to the position of the device 22. The distance between the optics 12 and the visible light 10 is dependent on the application of the device. For example the distance between the optics 12 and the visible light 10 may be anything from 0 mm though is expected to be in the region of 10 cm for desktop use, 50 cm when the optics project the visible light 10 to near a table or near a floor, 1 to 5 m when the optics project the visible light 10 inside a small room. The viewing medium 18 might be normal air with a normal amount of dust motes in it. It may also be any medium that creates reflective particles such as smoke or other particles in Brownian motion, or a clear or semi clear substance with or without particles in suspension such that an observer can see the visible light 10.

Figure 2:
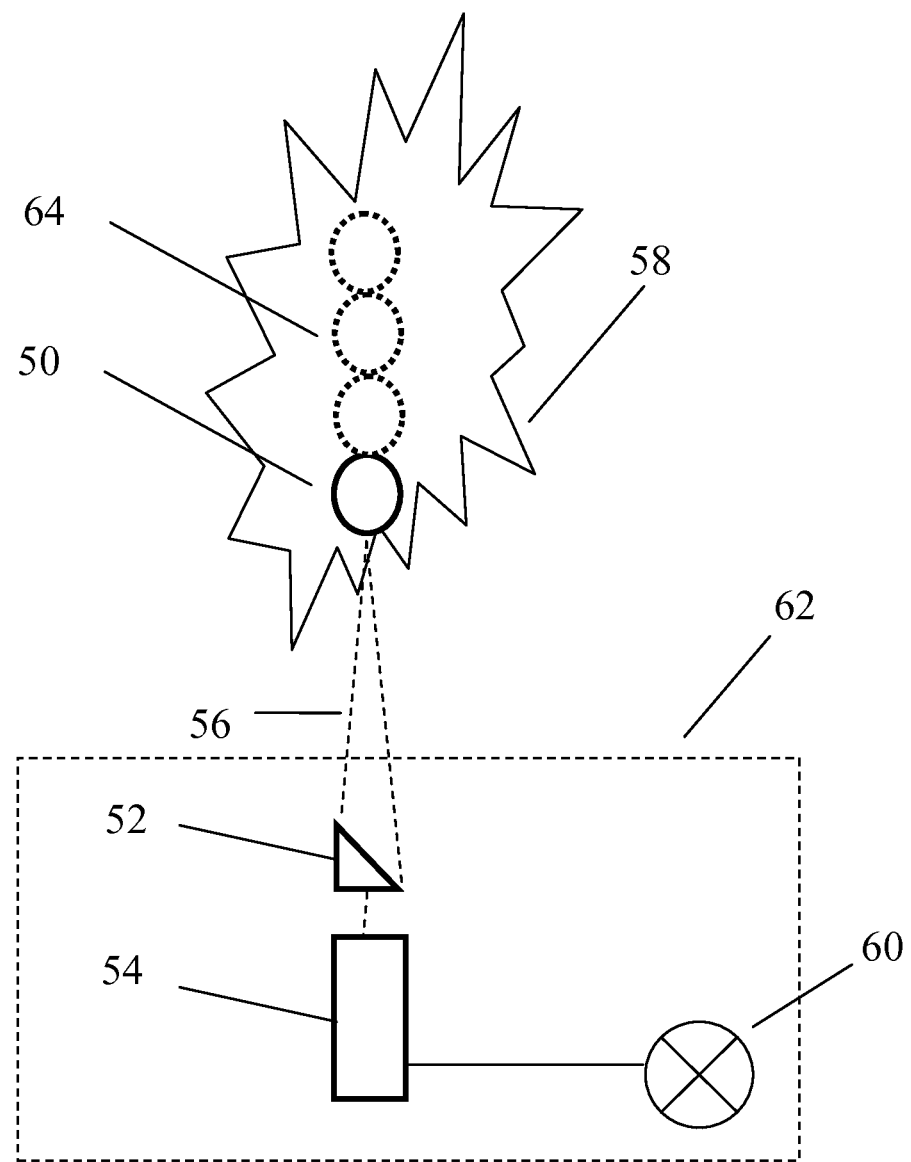
FIG. 2 is a schematic view of a device for forming visible static and moving images in space of the present invention.

Referring now to the invention shown in FIG. 2 there is shown a device for creating a visible light in space 62, having a visible light 50, and multiple rays of non-visible light 56 intersecting in a viewing medium 58. The lighting device consists of optics 52 and a light source 54, and user controls 60. Through the movement of the visible light 50 an observer perceives a visible image 64.

In more detail, still referring to the invention of FIG. 2 the visible light 50 is located in a suitable viewing medium 58 such as normal air and dust motes. Through control of the light source 54 and optics 52 the visible light 50 is moved in succession to create the two dimensional visible image 64 perceived by an observer. The non-visible rays of light 56 are in the visible spectrum at an intensity that is not visible to the observer. When sufficient non-visible intensity light rays combine the constructive nature of light intensity result in light of an intensity that it is visible, 50. The light source 54 creates light which may be at a non-visible intensity and—or at a visible intensity. The light rays 66 leaving the optics 52 are at a non-visible intensity and additional visible light may also be present. User controls 60 can adjust aspects of the light source 54 and optics 52, for example adjust the intensity of specific colors of light of the light rays 56, and the sequence of intersection points of the light rays 64. The light source 54 and optics 52 may generate multiple colors of light by the mediation of the light source 44 for example by adjusting the frequency or adjusting the combination of sub light sources in a compound light source, and—or by adjusting the optics 52, for example by using filters.

In further detail, still referring to the invention of FIG. 2 a convenient light source 54 may be a laser which are available at sizes less than 5 cm^3, or pulse lasers with a pulse width of say 50 ns or less, or LEDs that may have a size of less than 5 mm^3. The optics 52 mediate aspects of path, focus, and other optical properties of the light. These may be combinations of lenses and filters or micro machines such as DLP micro mirror projectors similar to those used in video projectors, or use a scanning mechanism such as an oscillating mirror and a rotating shaped mirror. The viewing medium 58 should be of a size suitable for the visible light image 50 and 62. Normal air containing naturally occurring dust motes may be sufficient, although other natural and artificially created viewing mediums may be used.

The construction details of the invention as shown in FIG. 2 are that the light source 54 is made from LEDs or lasers or other lighting device materials such as light bulbs, and the optics 52 can be any suitable optics components and materials such as glass, plastics, or mirrored material or micro machines with mounting or integrated materials for controlling the movement and positioning of the light rays 56. A simple construction has movement of the visible light 50 for example by means such as mechanical, micro-mechanical, or electronically controlled where the light source 54 and— or optics 52 adjust so that the relative position of the visible light 50 can be changed with respect to the position of the device 62. If the relative position of the visible light 50 is fixed with respect to the position of the device 62 then the visible light 50 may still move if the entire device 62 is moved, for example picked up and moved around by hand. The distance between the optics 52 and the visible light 50 is dependent on the application of the device. For example the distance between the optics 52 and the visible light 50 may be anything from 0 mm though the path of visible light is expected to be in the region of 0.1 mm to 1 m for some hand held use, 10 cm for desktop use, 50 cm when the optics project the visible light 50 to near a table or near a floor, 1 to 5 m when the optics project the visible light 50 inside a small room. The viewing medium 58 might be normal air with a normal amount of dust motes in it. It may also be any medium that creates reflective particles such as smoke or other particles in Brownian motion, or a clear or semi clear substance with or without particles in suspension such that an observer can see the visible light 50 and 64. One example of a pattern of light 64 that can be perceived by an observer is through the positioning of the visible light 50 such that the perceived image 64 is a straight line of light with a fixed length of about 1 m.

Figure 3:
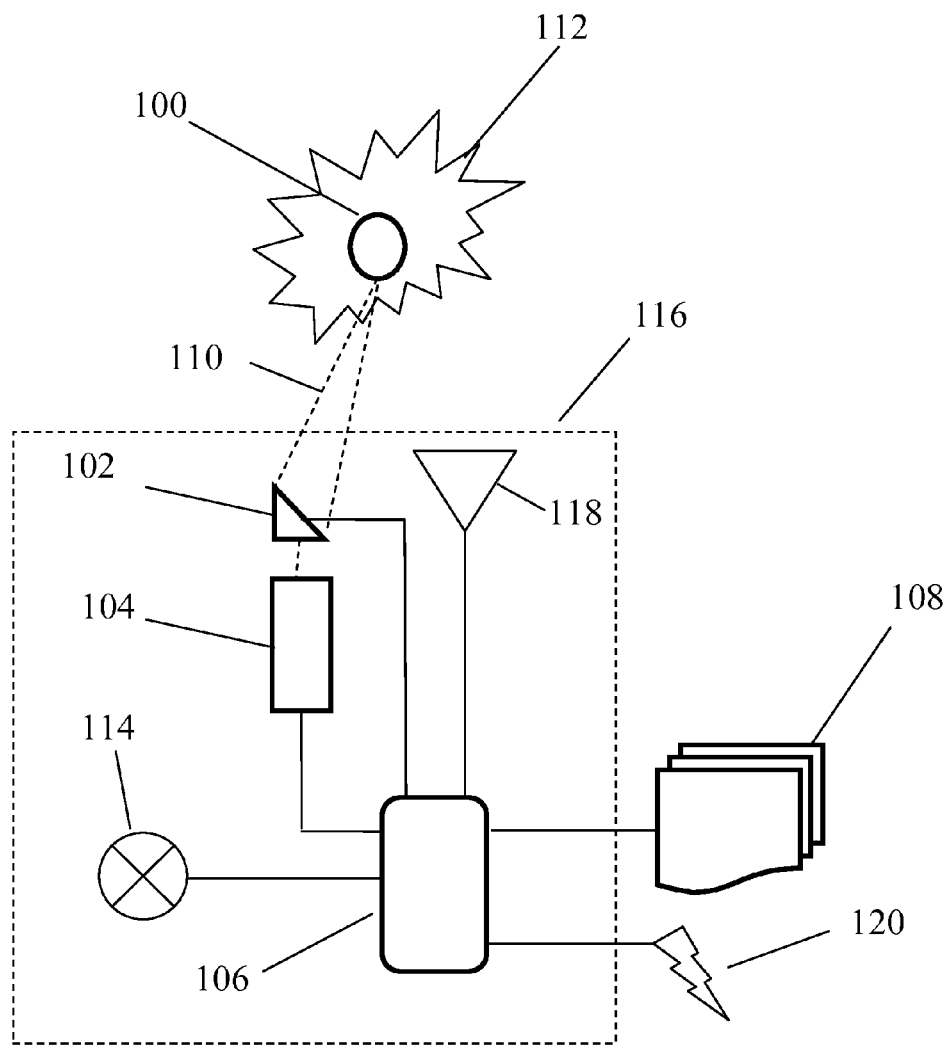
FIG. 3 is a schematic view of a device for forming visible static and moving images in space of the present invention.

Referring now to the invention shown in FIG. 3 there is shown a device for creating light in space 116 with visible light 100 and multiple rays of non-visible light 110 in a viewing medium 112. The device consists of optics 102 and a light source 104, with a controller 106, user controls 114, sensors and outputs 118, a data communication connection 120, and image data 108.

In more detail, still referring to the invention of FIG. 3 the visible light 100 is located in a suitable viewing medium 112 such as normal air and dust motes. The non-visible rays of light 110 are in the visible spectrum at an intensity that is not visible to the normal observer. When sufficient non-visible intensity light rays combine the constructive nature of light intensity result in light of an intensity that it is visible, 100. The light source 104 creates light which may be at a non-visible intensity and—or at a visible intensity. The light rays 110 leaving the optics 102 are at a non-visible intensity and additional visible light may also be present. The controller 106 controls the light source 104 and optics 102. The controller 106 can send control signals and receive feedback signals. Sensors and outputs 118 can send data to the controller and respond to data from the controller. Image data 108 can be input to the controller 106. User controls 114 can adjust aspects of the light source 104 and optics 102, for example adjust the intensity of specific colors of light of the light rays 110. The light source 104 and optics 102 may generate multiple colors of light by the mediation of the light source 104 for example by adjusting the frequency or adjusting the combination of sub light sources in a compound light source, and—or by adjusting the optics 12, for example by using filters. Outputs 118 may include a buzzer or speaker for audio output, or a vibrator for tactile output. Sensors 118 may send data to the controller about the visible light 100, the light rays 110, the viewing medium 112, the motion of the device 116, and other aspects that are detectable by sensor, so that the controller 106 can account for that data and respond to that data, for example by making sounds as the device 116 moves, or adjusting properties of the optics 102, or calibrating the optics 102, or adjusting properties of the light source 104, or calibrating the light sources 104. A data communication connection 120 can allow the controller 106 to communicate with other devices, for example via wired or wireless connection using Internet protocols such as "Wi-Fi" (Wi-Fi Alliance, Austin, USA). The data communication connection 120 allows, for example, communicating of the status and performance of the device 116 and its components, receiving and accessing image data such as 108, for communicating data associated with the image data such as an audio track, for communicating or coordinating with other display devices, and for communicating with user interface controls such as 114 for example through a software application running on a phone.

In further detail, still referring to the invention of FIG. 3 a convenient light source 104 may be one or more lasers which are available at sizes less than 5 cm^3, or pulse lasers with a pulse width of say 50 ns or less, or LEDs that may have a size of less than 5 mm^3. The optics 102 mediate aspects of path, focus, and other optical properties of the light. These may be combinations of lenses and filters or micro mirrors such as a micro mirrors display such as DLP micro mirror projector or use a scanning mechanism such as an oscillating mirror and a rotating shaped mirror. The controller 106 may be a computer or a micro computer or micro controller typically less than 5 cm^3. The controller 106 controls the light source and optics to position the visible light 100 in space. The input data 108 is information and need not have any physical size. Data on a compact memory card such as a micro SD card are in the region of 25 mm^3. The viewing medium 112 should be of a size suitable for the image as controlled by the image controller 106. Normal air containing naturally occurring dust motes may be sufficient, although other natural and artificially created viewing mediums may be used. The light source 104 and optics 102 illustrate the device with one light source, which may be remotely located to the controller 106. Suitable communication between the controller 106 and each other controlled component includes wired, direct connection, and wireless communication. The user control 114 may be remotely located to the controller 106. Suitable communication between the user controls 114 and the controller 106 includes wired, direct connection, and wireless communication such as a smart phone application. The outputs 118 may include means for the device 116 to give feedback to the user, such as a visual display screen, status lights, speaker, buzzer, or tactile vibrations. The sensors 118 may include any digital or analogue sensors, such as motion sensors, accelerometers, light sensors, magnetic sensors, radioactivity sensors, electromagnetic sensors, sound sensors, contact sensors, humidity sensors, and capacitive sensors. The sensors 118 may also be remote wireless or wired sensors. The sensors 118 used by the controller 106 will depend upon the application of the device 116 (for example is the device 116 intended to make a sound if it is moved?), and the functionality of the controller 106 (for example is the device 116 capable of self calibration?). A suitable data communications connection 120 would be over the Internet for example by Wi-Fi.

The construction details of the invention as shown in FIG. 3 are that the light source 104 is made from LEDs or lasers or other lighting device materials such as light bulbs, and the optics 102 can be any suitable optics components and materials such as glass, plastics, or mirrored material or micro machines with mounting or integrated materials for controlling the movement and positioning of the light rays 110. Movement of the visible light 100 is made for example by means such as mechanical, micro-mechanical, and—or electronically controlled where the light source 14 and—or optics 12 adjust so that the relative position of the visible light 100 can be changed with respect to the position of the device 22. The controller 106 is a computing device housed in a suitable material such as wood, metal or plastic. The distance between the optics 102 and the visible light 100 is dependent on the application of the device. The distance between the optics 102 and the visible light 100 may be anything from 0.1 mm though is expected to be in the region of 10 cm for desktop use, 50 cm when the optics project the visible light 100 to a near a table or near a floor, 1 to 5 m when the optics project the visible light 100 inside a small room. The viewing medium 112 might be normal air with a normal amount of dust motes in it. It may also be any medium that creates small reflective particles such as smoke or other particles in Brownian motion, or a clear or semi clear substance with or without particles in suspension such that an observer can see the visible light 10. Outputs 118 would typically be located inside the device 116 enclosure in a manner such they the display is understandable by the user, for example a display screen can be seen by the user, or a speaker can be heard by the user. Sensors 188 may be enclosed in the device 116 when the sensor types can function in an enclosure. Some sensors 118 are of a type that requires a view outside of any device enclosure or to be located semi or completely externally to an enclosure, for example a light sensitive sensor. The user controls 114 are located so that they are accessible to the operator. The most convenient data communications connection 120 would be to use Wi-Fi capabilities that were already integrated with the controller 106, if they were available, for example when the controller 106 is a computer or phone or tablet computer with integrated Wi-Fi or other telecommunications data services.

Figure 4:
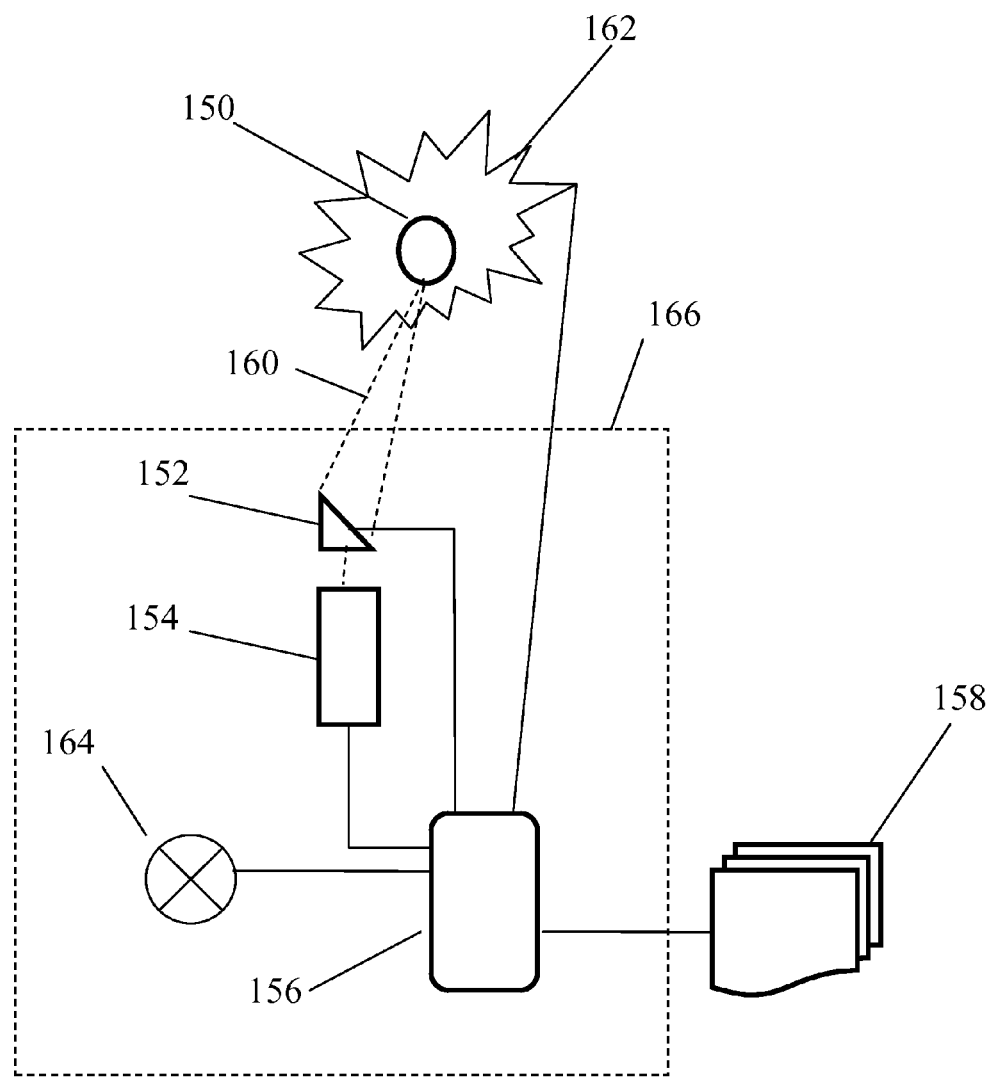
FIG. 4 is a schematic view of a device for forming visible static and moving images in a controlled viewing medium of the present invention.

Referring now to the invention shown in FIG. 4 there is shown a device for creating visible light in space 166, having a visible light 150 and multiple rays of non-visible light 160 intersecting in a viewing medium 162. The lighting device consists of optics 152 and a light source 154, with a controller 156, user controls 164, and image data 158.

In more detail, still referring to the invention of FIG. 4 the visible light 150 is located in a suitable viewing medium 162 such as normal air and dust motes. The non-visible rays of light 160 are in the visible spectrum at an intensity that is not visible to a normal observer. When sufficient non-visible intensity light rays combine the constructive nature of light intensity result in light of an intensity that it is visible, 150. The light source 154 creates light which may be at a non-visible intensity and—or at a visible intensity. The light rays 160 leaving the optics 152 are at a non-visible intensity and additional visible light may also be present. The controller 156 controls the light source 154 and optics 152 and the viewing medium 162. The controller 156 can send control signals and receive feedback signals. Image data 158 can be input to the controller 156. User controls 164 can adjust aspects of the light source 154 and optics 152, for example adjust the intensity of specific colors of light of the light rays 160. The light source 154 and optics 152 may generate multiple colors of light by the mediation of the light source 154 for example by adjusting the frequency or adjusting the combination of sub light sources in a compound light source, and—or by adjusting the optics 152, for example by using filters.

In further detail, still referring to the invention of FIG. 4 a convenient light source 154 may be one or more lasers which are available at sizes less than 5 cm^3, or pulse lasers with a pulse width of say 50 ns or less, or LEDs that may have a size of less than 5 mm^3. The optics 152 mediate aspects of path, focus, and other optical properties of the light. These may be combinations of lenses and filters or micro machines such as DLP micro mirror projectors or use a scanning mechanism such as an oscillating mirror and a rotating shaped mirror. The controller 156 may be a computer or a micro computer or micro controller typically less than 5 cm^3. The controller 156 controls the light sources and optics to position the visible light 150 in space as well as properties of the viewing medium. The input data 158 is digital or analogue information and need not have any physical size. Data on a compact memory card such as a micro SD card are in the region of 25 mm^3. The viewing medium 162 should be of a size suitable for the image as controlled by the image controller 156. Normal air containing naturally occurring dust motes may be sufficient, although other natural and artificially created viewing mediums may be used for consistency. The controller 156 may control aspects of the viewing medium 162. The light source 154 and optics 152 illustrate the device with one light source, which may be remotely located to the controller 156. Suitable communication between the controller 156 and each other controlled component includes wired, direct connection, and wireless communication. The user control 164 may be remotely located to the controller 156. Suitable communication between the user controls 164 and the controller 156 includes wired, direct connection, and wireless communication such as a smart phone application.

The construction details of the invention as shown in FIG. 4 are that the light source 154 is made from LEDs or lasers or other lighting device materials such as light bulbs, and the optics 152 can be any suitable optics components and materials such as glass, plastics, or mirrored material or micro machines with mounting or integrated materials for controlling the movement and positioning of the light rays 160. Movement of the visible light 150 is made for example by means such as mechanical, micro-mechanical, and—or electronically controlled where the light source 154 and—or optics 152 adjust so that the relative position of the visible light 150 can be changed with respect to the position of the device 166. The controller 156 is a computing device housed in a suitable material such as wood, metal or plastic. The distance between the optics 152 and the visible light 150 is dependent on the application of the device. The distance between the optics 152 and the visible light 150 may be anything from 0.1 mm though is expected to be in the region of 10 cm for desktop use, 50 cm when the optics project the visible light 150 to near a table or near a floor, 1 to 5 m when the optics project the visible light 150 inside a small room. The viewing medium 162 might be normal air with a normal amount of dust motes in it. It may also be any medium that creates small reflective particles such as smoke or other particles in Brownian motion, or a clear or semi clear substance with or without particles in suspension such that an observer can see the visible light 150.

Figure 5:
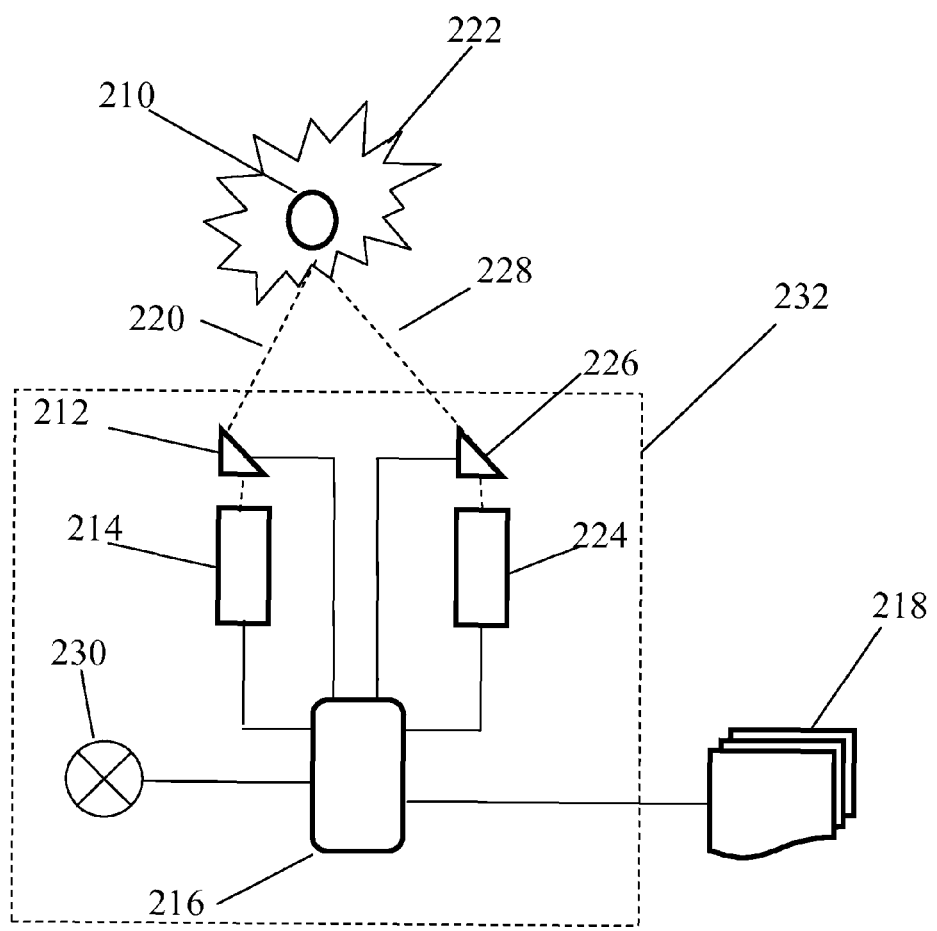
FIG. 5 is a schematic view of a device for forming visible static and moving images in space of the present invention.

Referring now to the invention shown in FIG. 5 there is shown a device for creating light in space 232 with visible light 210 and multiple rays of non-visible light 220 and 228 in a viewing medium 222. The device consists of more than one optics 212 and 226, and more than one light source 214 and 224, with a controller 216, user controls 230, and image data 218.

In more detail, still referring to the invention of FIG. 5 the visible light 210 is located in a suitable viewing medium 222 such as normal air and dust motes. The non-visible rays of light 220 and 228 are in the visible spectrum at an intensity that is not visible to the observer. When sufficient non-visible intensity light rays combine the constructive nature of light intensity result in light of an intensity that it is visible, 210. The light sources 214 and 224 create light which may be at a non-visible intensity and—or at a visible intensity. The light rays 220 and 228 leaving the optics 212 and 226 are at a non-visible intensity and additional visible light may also be present. The controller 216 controls the light sources 214 and 224 and optics 212 and 226. The controller 216 can send control signals and receive feedback signals. Image data 218 can be input to the controller 216. User controls 230 can adjust aspects of the light source 214 and 224 and optics 212 and 226, for example adjust the intensity of specific colors of light of the light rays 220 and 228. The light source 214 and 224 and optics 212 and 226 may generate multiple colors of light by the mediation of the light source 214 and 224 for example by adjusting the frequency or adjusting the combination of sub light sources in a compound light source, and—or by adjusting the optics 212 and 226, for example by using filters. Having more than one optics 212 and 226 and light sources 214 and 224 allows for sub component light source and optics pairs to be placed in separate locations.

In further detail, still referring to the invention of FIG. 5 convenient light sources 214 and 224 may be lasers which are available at sizes less than 5 cm^3, or pulse lasers with a pulse width of say 50 ns or less, or LEDs that may have a size of less than 5 mm^3. The optics 212 and 226 mediate aspects of path, focus, and other optical properties of the light. These may be combinations of lenses and filters or micro mirror displays such as a DLP micro mirror projector similar to those used in video projectors or use a scanning mechanism such as an oscillating mirror and a rotating shaped mirror. The controller 216 may be a computer the size of a desktop computer or a laptop computer, or a micro computer or micro controller which are typically less than 5 cm^3. The controller 216 controls the light sources and optics to position the visible light 210 in space. The input data 218 is information and need not have any physical size. Data on a compact memory card such as a micro SD card are in the region of 25 mm^3. The viewing medium 222 should be of a size suitable for the image as controlled by the image controller 216. Normal air containing naturally occurring dust motes may be sufficient, although other natural and artificially created viewing mediums may also be used. The light sources 214 and 224 and optics 212 and 226 illustrate the device with more than one light source, one or more of which may be remotely located to the others and still create the visible light 210. Suitable communication between the controller 216 and each other controlled component includes wired, direct connection, and wireless communication. The user control 230 may be remotely located to the controller 216. Suitable communication between the user controls 230 and the controller 216 includes wired, direct connection, and wireless communication such as a smart phone application. A sub component optics and light source system working with other components may comprise of an entire system that can work with other entire systems in concert.

The construction details of the invention as shown in FIG. 5 are that the light sources 214 and 224 are made from LEDs or lasers or other lighting device materials such as light bulbs, and the optics 212 and 226 can be any suitable optics components and materials such as glass, plastics, or mirrored material or micro machines with mounting or integrated materials for controlling the movement and positioning of the light rays 220 and 228. A simple construction has the components fixed such that the relative position of the visible light 210 is fixed with respect to the position of the device 232. More sophisticated construction involves movement of the visible light 210 for example by means such as mechanical, micro-mechanical, and—or electronically controlled where the light source 214 and 224 and—or optics 212 and 226 adjust so that the relative position of the visible light 210 can be changed with respect to the position of the device 232. The controller 216 is a computing device housed in any suitable material such as wood, metal or plastic. The distance between the optics 212 and 226 and the visible light 210 is dependent on the application of the device. The distance between the optics 212 and 226 and the visible light 210 may be anything from 0.1 mm though is expected to be in the region of 10 cm for desktop use, 50 cm when the optics project the visible light 210 to near a table or near a floor, and 1 to 5 m when the optics project the visible light 210 inside a small room. The viewing medium 222 might be normal air with a normal amount of dust motes in it. It may also be any medium that creates small reflective particles such as smoke or other particles in Brownian motion, or a clear or semi clear substance with or without particles in suspension such that an observer can see the visible light 210.

Figure 6:
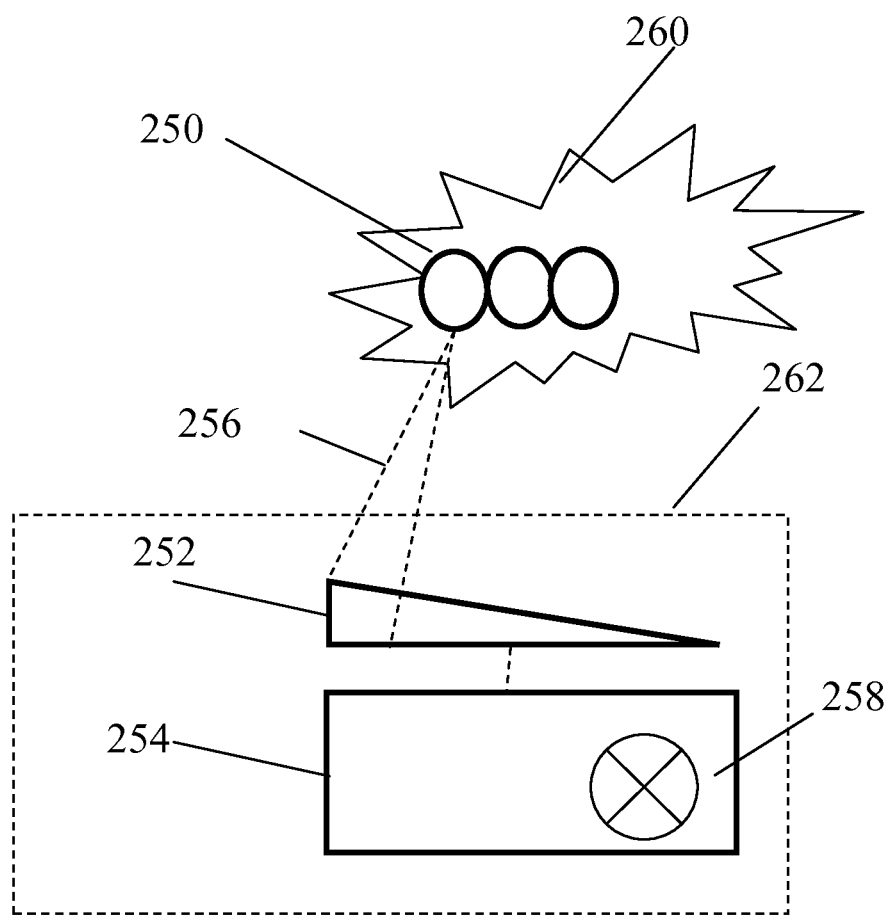
FIG. 6 is a schematic view of a device for forming visible static and moving images in space using a device with a display of the present invention.

Referring now to the invention shown in FIG. 6 there is shown a device for creating visible light in space 262, having multiple rays of non-visible light 256 intersecting in a viewing medium 260. The lighting device 262 consists of optics 252 and a computing device with its own screen such as a mobile phone or tablet computer 254, running a software application 258. An observer perceives visible light in space 250.

In more detail, still referring to the invention of FIG. 6 the visible light 250 is located in a suitable viewing medium 260 such as normal air and dust motes. The non-visible rays of light 256 are in the visible spectrum at an intensity that is not visible to the normal observer. When sufficient non-visible intensity light rays combine the constructive nature of light intensity result in light of an intensity that it is visible, 250. The light source is a computing device such as a cell phone or tablet computer 254 with its own light generating components such as a screen. A software application 258 running on the computing device 254 creates light on the computing devices screen which may be at a non-visible intensity and—or at a visible intensity. The light rays 256 leaving the optics 252 are at a non-visible intensity and additional visible light may also be present. The software application 258 may have some user controls, for example to adjust the intensity of specific colors of light of the light rays 256 or the perceived image 250. The computing device 254 may generate multiple colors of light if the screen is capable of generating multiple colors.

In further detail, still referring to the invention of FIG. 6 a convenient computing device 254 with an integrated light source may be a tablet computer such as an iPad (Apple Inc, California USA), or a mobile phone such as an iPhone (Apple Inc, California USA). The optics 252 mediate aspects of path, focus, and other optical properties of the light. The viewing medium 260 should be of a size suitable for the visible light image 250. Normal air containing naturally occurring dust motes may be sufficient, although other natural and artificially created viewing mediums may be used. The software application 258 would be aware of the geometry and optical properties of the optics and the geometry of the display capabilities of the computing device 254. If the computing device 254 has a camera that faces the same direction as its display and optics 252 then the software application 258 may use the camera image as sensor input to mediate software functions such as adjusting the light rays 256 and the visible image 250, as well as take photos and video. The software application 258 may take full advantage of the integrated facilities of the computing device 254, for example use the motion sensors to respond when the computing device is moved, use a camera to detect movement and take pictures, use audio facilities to generate sound, and use communications capabilities to communicate data.

The construction details of the invention as shown in FIG. 6 are that an optical layer is used as the optics 252 and placed over the screen of a computing device 254. A simple construction has the optics 252 have fixed focal points and be in the form of an optical layer. The computing device 254 may be a tablet computer with a screen display such as an iPad. The optical layer fits the screen side of the tablet computer, covering at least some of the screen. A software application 258 illuminates the screen of the device 254 in known positions under the optics 252 and controls the intensity of the light rays 256. The viewing medium 18 might be normal air with a normal amount of dust motes in it. It may also be any medium that creates reflective particles such as smoke or other particles in Brownian motion, or a clear or semi clear substance with or without particles in suspension such that an observer can see the visible light 250.

Figure 7:
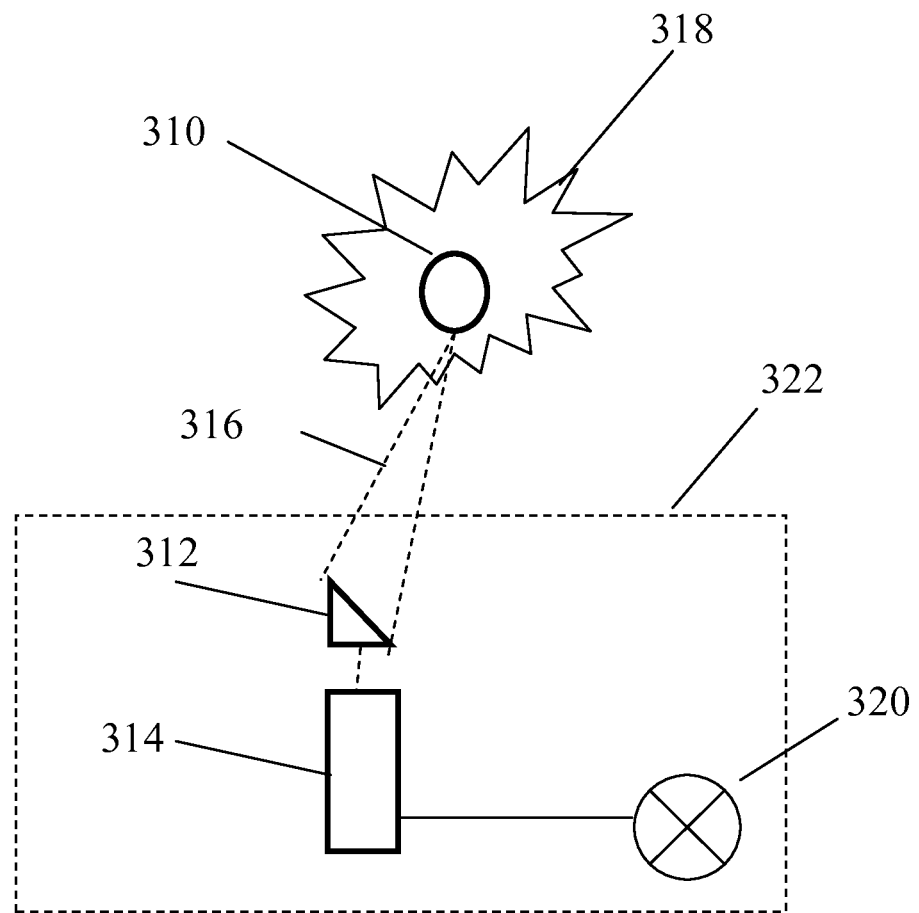
FIG. 7 is a schematic view of a device for forming visible static and moving images of varying colors in space of the present invention.

Referring now to the invention shown in FIG. 7 there is shown a device for creating visible light in space 322, having a visible light 310 and multiple rays of non-visible and visible light 316 intersecting in a viewing medium 318. The lighting device 322 consists of optics 312 and a light source 314, and user controls 320.

In more detail, still referring to the invention of FIG. 7 the visible light 310 is located in a suitable viewing medium 318 such as normal air and dust motes. There are visible and non-visible rays of light 316. The non-visible rays of light in the rays of light 316 are in the visible spectrum at an intensity that is not visible to the normal observer. The visible rays of light in the rays of light 316 are in the visible spectrum at an intensity that is visible to the normal observer. Where the visible and non-visible intensity light rays combine the constructive nature of light intensity result in light of an intensity that it is visible 310 and perceptually different to the visible component of the light 316. For example if the visible rays of light in the light 316 is of color Colour 1 made up of the colors visible-intensity-Colour 2 and visible-intensity-Colour 3, and the non-visible light is of color non-visible-intensity-Colour 3, then the visible rays of light 316 are perceived by an observer as color Colour 1, but the intersecting visible light is perceived by an observer as color Colour 4 made up of the colors visible-intensity-Colour 2 and visible-intensity-Colour 3 and non-visible-intensity-Colour 3. Adding more Colour 3 intensity to Colour 1 makes the visible rays of light 316 and the visible intersection of light 310 different colors. The light source 314 creates light which may be at a non-visible intensity and—or at a visible intensity. The light rays 316 leaving the optics 312 are a combination of some at a non-visible intensity and some at a visible intensity. The visible and non-visible components of light in the light rays 316 are managed by the optics 312 to intersect at the location of the visible light 310. User controls 320 can adjust aspects of the light source 314 and optics 312, for example adjust the intensity of specific colors of light of the light rays 316. The light source 314 and optics 312 may generate multiple colors of light by the mediation of the light source 314 for example by adjusting the frequency or adjusting the combination of sub light sources in a compound light source, and—or by adjusting the optics 312, for example by using filters.

In further detail, still referring to the invention of FIG. 7 a convenient light source 314 may be one or more lasers which are available at sizes less than 5 cm^3, or pulse lasers with a pulse width of say 50 ns or less, or LEDs that may have a size of less than 5 mm^3. The optics 312 mediate aspects of path, focus, and other optical properties of the light. These may be combinations of lenses and filters or micro machines such as DLP micro mirror projectors similar to those used in video projectors, or use a scanning mechanism such as an oscillating mirror and a rotating shaped mirror. The viewing medium 318 should be of a size suitable for the visible light image 310. Normal air containing naturally occurring dust motes may be sufficient, although other natural and artificially created viewing mediums may be used.

The construction details of the invention as shown in FIG. 7 are that the light source 314 is made from LEDs or lasers or other lighting device materials such as light bulbs, and the optics 312 can be any suitable optics components and materials such as glass, plastics, or mirrored material or micro machines with mounting or integrated materials for controlling the movement and positioning of the light rays 316. A simple construction has the components fixed such that the relative position of the visible light 310 is fixed with respect to the position of the device 322. More sophisticated construction involves movement of the visible light 310 for example by means such as mechanical, micro-mechanical, and—or electronically controlled where the light source 314 and—or optics 312 adjust so that the relative position of the visible light 310 can be changed with respect to the position of the device 322. The distance between the optics 312 and the visible light 310 is dependent on the application of the device. For example the distance between the optics 312 and the visible light 310 may be anything from 0 mm though is expected to be in the region of 10 cm for desktop use, 50 cm when the optics project the visible light 310 to near a table or near a floor, 1 to 5 m when the optics project the visible light 310 inside a small room. The viewing medium 318 might be normal air with a normal amount of dust motes in it. It may also be any medium that creates reflective particles such as smoke or other particles in Brownian motion, or a clear or semi clear substance with or without particles in suspension such that an observer can see the visible light 310.

Figure 8:
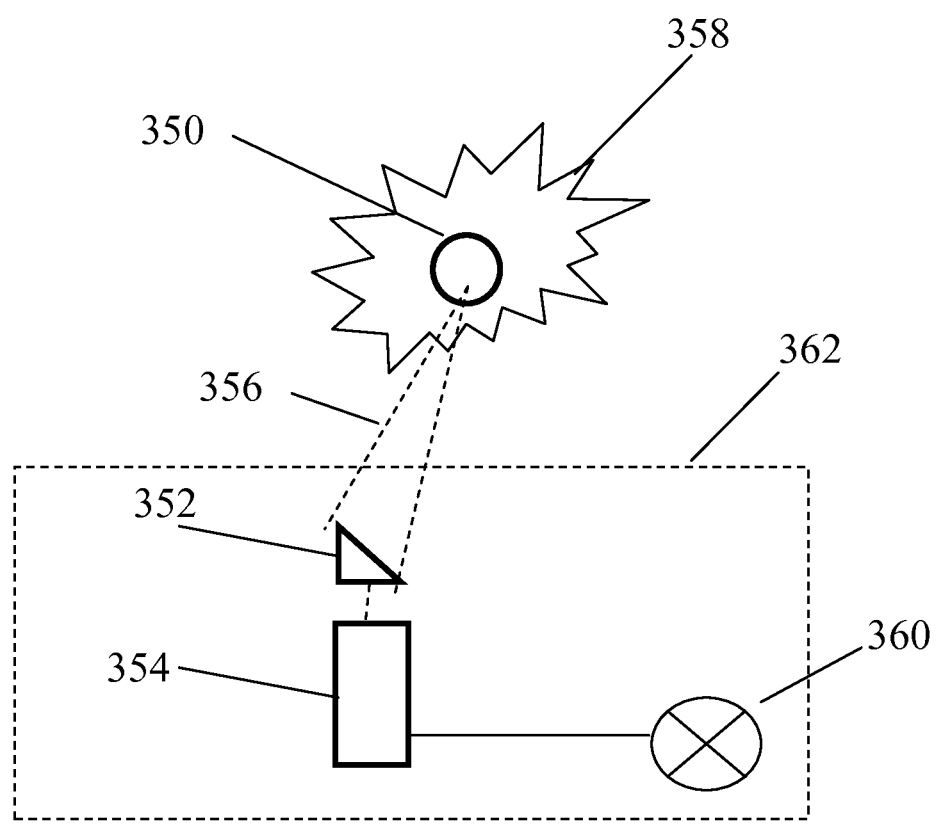
FIG. 8 is a schematic view of a device for forming visible static and moving images of varying colors in space of the present invention.

Referring now to the invention shown in FIG. 8 there is shown a device for creating visible light in space 362, having a visible light 350 and multiple rays of non-visible light 356 intersecting in a viewing medium 358. The lighting device 362 consists of optics 352 and a light source 354, and user controls 360.

In more detail, still referring to the invention of FIG. 8 the visible light 350 is located in a suitable viewing medium 358 such as normal air and dust motes. There are non-visible rays of light 356. The non-visible rays of light 356 are in the visible spectrum at an intensity that is not visible to the normal observer. The non-visible rays of light 356 are focused by the optics 352. The focal point of the non-visible rays of light 356 is the position of the visible light 350. Where the non-visible intensity light rays combine the constructive nature of light intensity result in light of an intensity that it is visible 350. The light source 354 creates light which may be at a non-visible intensity or a visible intensity. The light rays 356 leaving the optics 352 are at a non-visible intensity and some visible intensity light may also be present. User controls 320 can adjust aspects of the light source 354 and optics 352, for example adjust the intensity of specific colors of light of the light rays 356 or the focal point. The light source 354 and optics 352 may generate multiple colors of light by the mediation of the light source 354 for example by adjusting the frequency or adjusting the combination of sub light sources in a compound light source, and—or by adjusting the optics 352, for example by using filters.

In further detail, still referring to the invention of FIG. 8 a convenient light source 354 may be one or more lasers which are available at sizes less than 5 cm^3, or pulse lasers with a pulse width of say 50 ns or less, or LEDs that may have a size of less than 5 mm^3. The optics 532 mediate aspects of path, focus, and other optical properties of the light. These may be combinations of lenses and filters or micro machines such as DLP micro mirror projectors similar to those used in video projectors, or use a scanning mechanism such as an oscillating mirror and a rotating shaped mirror. The viewing medium 358 should be of a size suitable for the visible light image 350. Normal air containing naturally occurring dust motes may be sufficient, although other natural and artificially created viewing mediums may be used.

The construction details of the invention as shown in FIG. 8 are that the light source 354 is made from LEDs or lasers or other lighting device materials such as light bulbs, and the optics 352 can be any suitable optics components and materials such as glass, plastics, or mirrored material or micro machines with mounting or integrated materials for controlling the movement and positioning and focal point of the light rays 356. A simple construction has the components fixed such that the relative position of the visible light 350 is fixed with respect to the position of the device 362. More sophisticated construction involves movement of the visible light 350 for example by means such as mechanical, micromechanical, and—or electronically controlled focal points where the light source 354 and—or optics 352 adjust so that the relative position of the visible light 350 can be changed with respect to the position of the device 362. The distance between the optics 352 and the visible light 350 is dependent on the application of the device. For example the distance between the optics 352 and the visible light 350 may be anything from 0 mm though is expected to be in the region of 10 cm for desktop use, 50 cm when the optics project the visible light 350 to near a table or near a floor, 1 to 5 m when the optics project the visible light 350 inside a small room. The viewing medium 358 might be normal air with a normal amount of dust motes in it. It may also be any medium that creates reflective particles such as smoke or other particles in Brownian motion, or a clear or semi clear substance with or without particles in suspension such that an observer can see the visible light 350.

The advantages of the present invention include, without limitation, the ability to create visible light that is located in space. Patterns, letters, and images can be created in visible light in one dimension or multiple dimensions. Further, aspects of the visible light such as color, intensity, duration, and position can be controlled. By moving the light in space an observer can see still or moving images. Further the device creates visible light that does not require visible scanning or positioning or creation beams of light or artifacts. Further the creation of visible light from non-visible light is quiet. Further, the light sources in the device require relatively little power, and are safer for observers to interrupt and be near, compared to relatively high powered light generating devices.

In broad embodiment, the present invention is a device that creates visible light in space without the need for visible beams of light such as scanning lines or image creation artifacts.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention.

I claim:

1. A device for forming visible light comprising of:
   a plurality of light sources, each of the light sources configured to generate only light rays of wavelengths that are in the visible spectrum and of an intensity that is below a threshold for being visible to an observer;
   and an optics system structured to cause multiple of the light rays to intersect, the intersected light rays having a combined light intensity above the threshold for being visible to the observer.

2. A device of claim 1, further comprising of a control system, which is a plurality of internal and user controls operative to adjust aspects of the plurality of light sources and or the optics system.

3. A device of claim 1, wherein the light source comprises of at least one of:
   a light bulb,
   a light emitting diode,
   a laser, and
   the display of a computing device.

4. A device of claim 1, wherein the plurality of light sources and or the optics system are operative to adjust mutable aspects of the light rays and visible image including at least one of:
   path,
   position,
   intersection points,
   focus,
   frequency/color, intensity,
image,
and time sequencing.

5. A device of claim 1, wherein the non visible irradiated light rays have an intensity $<=3$ cd/m$^2$ and or $<=0.003$ cd/m$^2$.

6. A device of claim 1, wherein the optics system comprises of at least one of:
a lens,
a filter,
a scanning mechanism,
a path mechanism,
a focus mechanism,
a mirror,
an oscillating mirror,
a rotating shaped mirror,
a micro-machine,
a DLP micro mirror projector,
an analogue component,
and a digital component.

7. A device of claim 1, wherein the light sources and components of the optical system that are in multiple locations.

8. A device of claim 2, wherein the control system has a programmable component.

9. A device of claim 2, further comprising of a data component that can receive and store and access image and or sensory and or general data.

10. A device of claim 2, further comprising sensors and outputs.

11. A device of claim 2 further comprising a data communication system that can do at least one of:
communicate over wire,
communicate wirelessly,
communicate with sub components of the device,
communicate with other devices,
communicate with a separate remote control system,
communicate with a devise able to mediate the viewing medium,
and communicate over the Internet.

12. A device of claim 10, wherein the output comprises of at least one of:
a buzzer,
a speaker,
a vibrator,
a visual display,
a tactile display,
a data channel for data output,
and an audio channel for audio data output.

13. The device of claim 10 wherein the control system is operative to calibrate at least one of: the optics system, and the light sources.

14. The device of claim 10, wherein the sensors comprise of at least one of:
digital sensors,
analogue sensors,
motion sensors,
orientation sensors,
acceleration sensors,
light sensors,
radiation sensors,
magnetic sensors,
electromagnetic sensors,
sound sensors,
contact sensors,
humidity sensors,
pressure sensors,
stretch sensors,
olfactory sensors,
and capacitive sensors.

* * * * *